US012660042B2

(12) United States Patent
Zhang et al.

(10) Patent No.: US 12,660,042 B2
(45) Date of Patent: Jun. 16, 2026

(54) METHODS AND APPARATUS TO SET MRB CONFIGURATION FOR UE TO RECEIVE MBS MULTICAST IN RRC INACTIVE STATE

(71) Applicant: MediaTek Singapore Pte. Ltd., Singapore (SG)

(72) Inventors: Xiaonan Zhang, Beijing (CN); Yuanyuan Zhang, Beijing (CN); Xuelong Wang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 316 days.

(21) Appl. No.: 18/337,011

(22) Filed: Jun. 18, 2023

(65) Prior Publication Data

US 2023/0413380 A1 Dec. 21, 2023

Related U.S. Application Data

(63) Continuation-in-part of application No. PCT/CN2022/099878, filed on Jun. 20, 2022.

(51) Int. Cl.
H04W 76/40 (2018.01)
H04W 76/27 (2018.01)

(52) U.S. Cl.
CPC ........... H04W 76/40 (2018.02); H04W 76/27 (2018.02)

(58) Field of Classification Search
CPC ....... H04W 76/40; H04W 76/27; H04W 4/50; H04W 4/06
See application file for complete search history.

(56) References Cited

U.S. PATENT DOCUMENTS 12,238,746 B2 * 2/2025 Narayanan Thangaraj ................. H04W 4/06
12,369,224 B2 * 7/2025 Byun ........................ H04L 1/08
(Continued)

FOREIGN PATENT DOCUMENTS

CN 113225695 B * 12/2022 .............. H04W 4/08
CN 115843453 A * 3/2023 .............. H04W 4/50
(Continued)

OTHER PUBLICATIONS

3GPP (3GPP TR 23.757 V17.0.0 (Mar. 202), 3rd Generation Partnership Project; Technical Specification Group Services and System Aspects; Study on architectural enhancements for 5G multicast-broadcast services (Release 17); hereinafter NPL1) (Year: 2021).*
(Continued)

*Primary Examiner* — Michael A Keller
(74) *Attorney, Agent, or Firm* — Helen Mao; Imperium Patent Works

(57) ABSTRACT

Apparatus and methods are provided for the UE to receive multicast transmission in RRC INACTIVE state. In one embodiment, the UE joins a multicast session, receives a MRB configuration for a multicast service, establishes an MRB for reception of the multicast service in the RRC INACTIVE state, and receives data transmission of the multicast service with the established MRB in the RRC INACTIVE state. In one embodiment, the UE stores the MRB configuration in the buffer when the multicast session has not started when the MRB configuration is received. In one embodiment, the UE receives a notification for the multicast session start in the RRC INACTIVE state and establishes the MRB based on the stored MRB configuration. In one embodiment, the UE, in the INACTIVE state, updates the multicast resource/MTCH information based on one or more predefined conditions.

20 Claims, 8 Drawing Sheets

(56) References Cited

U.S. PATENT DOCUMENTS

| | | | | | |
|---|---|---|---|---|---|
| 12,408,184 | B2 * | 9/2025 | Latheef | ............... | H04W 4/06 |
| 2021/0127448 | A1 * | 4/2021 | Kadiri | ............... | H04W 76/27 |
| 2022/0369411 | A1 * | 11/2022 | Agiwal | ............... | H04L 5/0053 |
| 2023/0239661 | A1 * | 7/2023 | Pham | ............... | H04W 4/06 |
| | | | | | 370/329 |
| 2023/0284322 | A1 * | 9/2023 | Xie | ............... | H04W 76/27 |
| | | | | | 370/329 |
| 2023/0328763 | A1 * | 10/2023 | Babaei | ............... | H04W 48/20 |
| 2023/0328843 | A1 * | 10/2023 | Babaei | ............... | H04W 76/40 |
| | | | | | 370/312 |
| 2023/0354465 | A1 * | 11/2023 | Fujishiro | ............... | H04W 76/40 |
| 2023/0370905 | A1 * | 11/2023 | Babaei | ............... | H04W 36/0007 |
| 2024/0098843 | A1 * | 3/2024 | Kadiri | ............... | H04W 76/15 |
| 2024/0260134 | A1 * | 8/2024 | Babaei | ............... | H04W 4/06 |
| 2024/0340929 | A1 * | 10/2024 | Narayanan Thangaraj | ............... | |
| | | | | | H04W 74/0833 |
| 2024/0365349 | A1 * | 10/2024 | Narayanan Thangaraj | ............... | |
| | | | | | H04W 4/06 |
| 2024/0373496 | A1 * | 11/2024 | Jiang | ............... | H04W 76/27 |
| 2024/0430980 | A1 * | 12/2024 | Wu | ............... | H04L 12/189 |
| 2025/0048062 | A1 * | 2/2025 | Li | ............... | H04W 76/40 |
| 2025/0056650 | A1 * | 2/2025 | Li | ............... | H04W 76/40 |
| 2025/0106931 | A1 * | 3/2025 | Qi | ............... | H04W 48/20 |
| 2025/0133578 | A1 * | 4/2025 | Pham Van | ............... | H04L 12/189 |
| 2025/0261282 | A1 * | 8/2025 | Fujishiro | ............... | H04W 36/08 |
| 2025/0267764 | A1 * | 8/2025 | Babaei | ............... | H04W 4/06 |
| 2025/0274816 | A1 * | 8/2025 | Babaei | ............... | H04W 76/40 |
| 2025/0287462 | A1 * | 9/2025 | Li | ............... | H04W 76/27 |

FOREIGN PATENT DOCUMENTS

| | | | | | | |
|---|---|---|---|---|---|---|
| CN | 116250367 | A | * | 6/2023 | ............ | H04W 76/40 |
| CN | 116390173 | A | * | 7/2023 | ............ | H04W 76/40 |
| CN | 116567864 | A | * | 8/2023 | ............ | H04W 76/27 |
| CN | 116918358 | A | * | 10/2023 | ............ | H04W 4/06 |
| CN | 117278945 | A | * | 12/2023 | ............ | H04W 4/06 |
| CN | 117812544 | A | * | 4/2024 | ............ | H04W 76/40 |
| CN | 117898003 | A | * | 4/2024 | ........ | H04W 74/0833 |
| CN | 118140545 | A | * | 6/2024 | ............ | H04W 76/40 |
| CN | 115443667 | B | * | 7/2024 | ............ | H04W 76/40 |
| CN | 118678301 | A | * | 9/2024 | ............ | H04W 76/27 |
| CN | 118741733 | A | * | 10/2024 | ........ | H04W 74/0833 |
| CN | 119256570 | A | * | 1/2025 | ............ | H04W 76/28 |
| CN | 119384835 | A | * | 1/2025 | ............ | H04W 76/40 |
| CN | 119487802 | A | * | 2/2025 | ............ | H04L 5/001 |
| CN | 119586313 | A | * | 3/2025 | ............ | H04W 76/40 |
| CN | 120153619 | A | * | 6/2025 | ............ | H04W 68/02 |
| CN | 120457710 | A | * | 8/2025 | ............ | H04W 76/27 |
| CN | 120937495 | A | * | 11/2025 | ............ | H04W 76/27 |
| EP | 4216579 | A1 | * | 7/2023 | ............ | H04W 76/40 |
| EP | 4258705 | A1 | * | 10/2023 | ............ | H04W 4/06 |
| EP | 4319205 | A1 | * | 2/2024 | ............ | H04W 76/40 |
| EP | 4258705 | B1 | * | 3/2025 | ............ | H04W 76/40 |
| EP | 4531465 | A2 | * | 4/2025 | ............ | H04W 76/40 |
| EP | 4604635 | A2 | * | 8/2025 | ............ | H04W 48/20 |
| JP | WO2022/085757 | A1 | | 10/2022 | | |
| JP | 2023536688 | A | * | 8/2023 | ............ | H04W 4/50 |
| JP | WO2022149489 | A5 | * | 9/2023 | | |
| JP | 2023542285 | A | * | 10/2023 | ............ | H04W 76/40 |
| JP | 7448689 | B2 | * | 3/2024 | ............ | H04W 4/06 |
| JP | 7521694 | B2 | * | 7/2024 | ............ | H04W 76/40 |
| JP | 2024531895 | A | * | 9/2024 | ........ | H04W 74/0833 |
| JP | 2024133178 | A | * | 10/2024 | ............ | H04W 76/40 |
| JP | 2024138354 | A | * | 10/2024 | ............ | H04W 76/20 |
| JP | 2024539179 | A | * | 10/2024 | ............ | H04W 76/40 |
| JP | 2024539184 | A | * | 10/2024 | ........ | H04W 72/1263 |
| JP | 2024539231 | A | * | 10/2024 | ............ | H04W 76/27 |
| JP | 7658500 | B2 | * | 4/2025 | ............ | H04W 76/40 |
| JP | 2025081543 | A | * | 5/2025 | ............ | H04W 76/27 |
| JP | 2025092598 | A | * | 6/2025 | ........ | H04W 36/0022 |
| JP | WO2024071159 | A5 | | 6/2025 | | |
| JP | 7709594 | B2 | * | 7/2025 | ........ | H04W 74/0833 |
| JP | 7717100 | B2 | * | 8/2025 | ............ | H04W 68/02 |
| JP | 2025525019 | A | * | 8/2025 | ............ | H04W 76/40 |
| JP | 2025148410 | A | * | 10/2025 | ........ | H04W 74/0833 |
| JP | WO2024162426 | A5 | * | 10/2025 | | |
| JP | 2025186474 | A | * | 12/2025 | | |
| JP | WO2024210086 | A5 | * | 12/2025 | | |
| KR | 20240007933 | A | * | 1/2024 | ............ | H04W 76/40 |
| KR | 20240021552 | A | * | 2/2024 | ............ | H04W 76/40 |
| KR | 20240040811 | A | * | 3/2024 | ........ | H04W 4/0833 |
| KR | 20240102979 | A | * | 7/2024 | ............ | H04W 76/27 |
| KR | 20250003633 | A | * | 1/2025 | ............ | H04W 76/40 |
| KR | 20250006858 | A | * | 1/2025 | ............ | H04W 76/28 |
| KR | 20250036075 | A | * | 3/2025 | ............ | H04L 5/001 |
| WO | WO-2021158024 | A1 | * | 8/2021 | ............ | H04W 4/06 |
| WO | WO-2022002830 | A1 | * | 1/2022 | ............ | H04W 4/06 |
| WO | WO-2022031109 | A1 | * | 2/2022 | ............ | H04W 4/06 |
| WO | WO-2022031127 | A1 | * | 2/2022 | ............ | H04W 4/06 |
| WO | WO-2022054876 | A1 | * | 3/2022 | ............ | H04W 76/40 |
| WO | WO-2022085757 | A1 | * | 4/2022 | ............ | H04W 76/40 |
| WO | WO-2022149489 | A1 | * | 7/2022 | ............ | H04W 4/06 |
| WO | WO-2022205381 | A1 | * | 10/2022 | ............ | H04W 76/40 |
| WO | WO-2022239690 | A1 | * | 11/2022 | ............ | H04W 8/22 |
| WO | WO-2022240194 | A1 | * | 11/2022 | ............ | H04L 5/0044 |
| WO | WO-2022240984 | A2 | * | 11/2022 | ............ | H04W 68/02 |
| WO | WO-2023273355 | A1 | * | 1/2023 | ............ | H04W 72/02 |
| WO | WO-2023069377 | A2 | * | 4/2023 | ............ | H04W 76/40 |
| WO | WO-2023069709 | A1 | * | 4/2023 | ............ | H04W 76/27 |
| WO | WO-2023069746 | A1 | * | 4/2023 | ........ | H04W 36/0077 |
| WO | WO-2023128618 | A1 | * | 7/2023 | ............ | H04W 68/02 |
| WO | WO-2023132209 | A1 | * | 7/2023 | ............ | H04W 76/11 |
| WO | WO-2024034566 | A1 | * | 2/2024 | ............ | H04W 76/34 |
| WO | WO-2024035122 | A1 | * | 2/2024 | ............ | H04W 4/06 |
| WO | WO-2024092751 | A1 | * | 5/2024 | ............ | H04W 68/02 |
| WO | WO-2024096048 | A1 | * | 5/2024 | ........ | H04W 36/0007 |
| WO | WO-2024096502 | A1 | * | 5/2024 | ............ | H04W 76/22 |
| WO | WO-2024170343 | A1 | * | 8/2024 | ............ | H04W 76/40 |

OTHER PUBLICATIONS

European Intellectual Property Office Action 23176767.4-1216, dated Nov. 22, 2023 (15 pages).

Mediatek Inc: "Discussion on multicast enhancement for RRC Inactive state", 3GPP Draft; R2-2209876,vol. RAN WG2, No. Electronic; Oct. 10, 2022-Oct. 19, 2022, XP052263201.

Xiaonan Zhang et al: "Discuss on PTM configuration for multicast in RRC Inactive", 3GPP Draft R2-2300286; Type Discussion; NR_MBS_ENH-Core, vol. 3GPP RAN2, No. Athens, GR; Feb. 27, 2023-Mar. 3, 2023, XP052244933.

* cited by examiner

RRC CONNECTED STATE
611

UE JOINS MULTICAST SESSION
621

RRC RELEASE (SUSPEND INDICATION WITH MRB CFG)
622

RRC INACTIVE STATE
612

MULTICAST NO START OR NO DL DATA IN THE MULTICAST SESSION
631

STORE MRB CONFIG
613

MULTICAST STARTED
632

GROUP PAGING NOTIFICATION
623

MRB CONFIGURATION
614

DL DATA (MULTICAST)
640

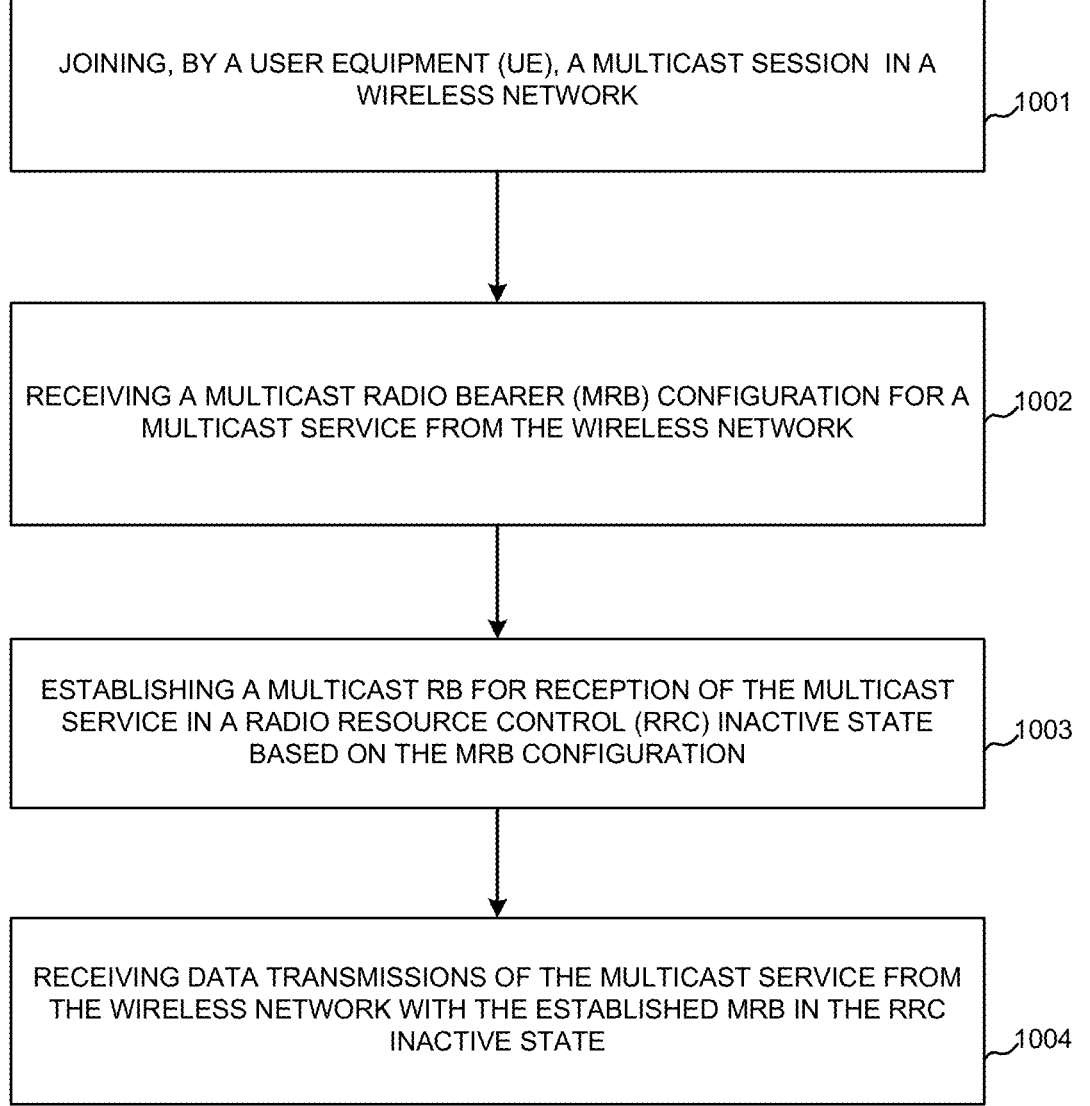

JOINING, BY A USER EQUIPMENT (UE), A MULTICAST SESSION IN A WIRELESS NETWORK    1001

RECEIVING A MULTICAST RADIO BEARER (MRB) CONFIGURATION FOR A MULTICAST SERVICE FROM THE WIRELESS NETWORK    1002

ESTABLISHING A MULTICAST RB FOR RECEPTION OF THE MULTICAST SERVICE IN A RADIO RESOURCE CONTROL (RRC) INACTIVE STATE BASED ON THE MRB CONFIGURATION    1003

RECEIVING DATA TRANSMISSIONS OF THE MULTICAST SERVICE FROM THE WIRELESS NETWORK WITH THE ESTABLISHED MRB IN THE RRC INACTIVE STATE    1004

FIG. 10

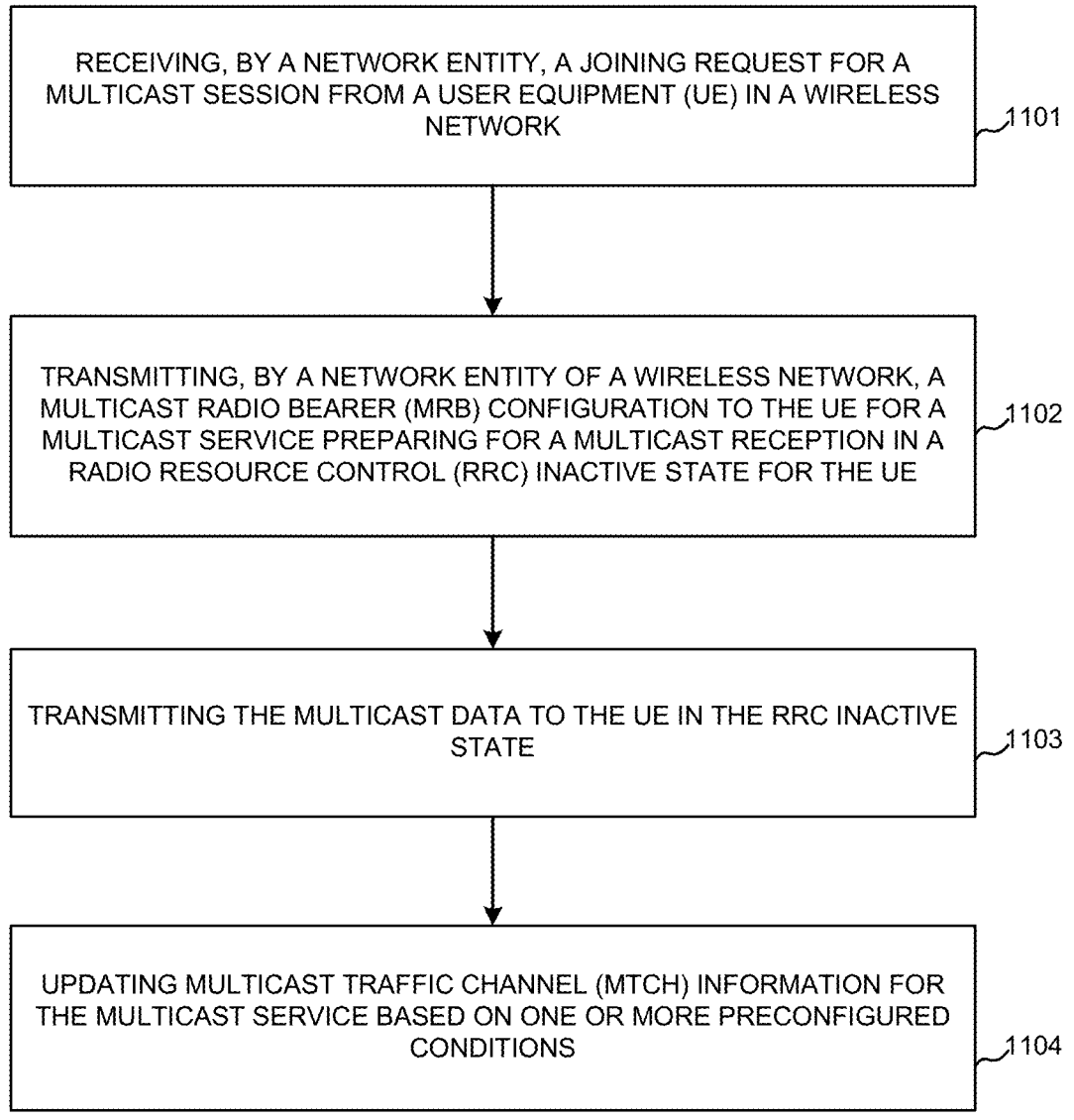

RECEIVING, BY A NETWORK ENTITY, A JOINING REQUEST FOR A MULTICAST SESSION FROM A USER EQUIPMENT (UE) IN A WIRELESS NETWORK ⟋1101

TRANSMITTING, BY A NETWORK ENTITY OF A WIRELESS NETWORK, A MULTICAST RADIO BEARER (MRB) CONFIGURATION TO THE UE FOR A MULTICAST SERVICE PREPARING FOR A MULTICAST RECEPTION IN A RADIO RESOURCE CONTROL (RRC) INACTIVE STATE FOR THE UE ⟋1102

TRANSMITTING THE MULTICAST DATA TO THE UE IN THE RRC INACTIVE STATE ⟋1103

UPDATING MULTICAST TRAFFIC CHANNEL (MTCH) INFORMATION FOR THE MULTICAST SERVICE BASED ON ONE OR MORE PRECONFIGURED CONDITIONS ⟋1104

FIG. 11

METHODS AND APPARATUS TO SET MRB CONFIGURATION FOR UE TO RECEIVE MBS MULTICAST IN RRC INACTIVE STATE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/099878, titled "METHODS AND APPARATUS TO SET MRB CONFIGURATION FOR UE TO RECEIVE MBS MULTICAST IN RRC INACTIVE STATE," with an international filing date of Jun. 20, 2022. This application claims priority under 35 U.S.C. § 119 from Chinese Application Number 202310581137.X, titled "METHODS AND APPARATUS TO SET MRB CONFIGURATION FOR UE TO RECEIVE MBS MULTICAST IN RRC INACTIVE STATE," filed on May 22, 2023. The disclosure of each of the foregoing documents is incorporated herein by reference.

TECHNICAL FIELD

The disclosed embodiments relate generally to wireless communication, and, more particularly, to MRB configuration for UE receiving multicast in the radio resource control (RRC) INACTIVE state.

BACKGROUND

With the exponential growth of wireless data services, the content delivery to large mobile user groups has grown rapidly. Various cellular systems, including both 4G/LTE and 5G/NR systems, may provide a multicast functionality, which allows user equipments (UEs) in the system to receive multicast services transported by the cellular system. A variety of applications may rely on communication over multicast transmission, such as live stream, video distribution, vehicle-to-everything (V2X) communication, public safety (PS) communication, file download, and so on. In the legacy system, the multicast service is received by UE which is in the RRC CONNECTED state. With the development of the multicast services, the service needs to address high load/congestion scenario. With the growth of the multicast services, improvements for the multicast service in terms of power saving, service coverage and spectrum efficiency become an important topic.

Improvements and enhancements are required to improve multicast service with new ability to configure and receive the multicast services.

SUMMARY

Apparatus and methods are provided for the UE to receive multicast transmission in RRC INACTIVE state. In one embodiment, the UE joins a multicast session, receives an MRB configuration for a multicast service, establishes an MRB for reception of the multicast service in the RRC INACTIVE state based on the MRB configuration, and receives data transmission of the multicast service with the established MRB in the RRC INACTIVE state. In one embodiment, the MRB configuration is received in an RRC release message. In one embodiment, the multicast MRB configuration is delivered in the suspendconfig. In one embodiment, the UE stores the MRB configuration in the buffer when the multicast session has not started when the MRB configuration is received. In one embodiment, the UE receives a notification for the multicast session starting in the RRC INACTIVE state and establishes the MRB based on the stored MRB configuration. In another embodiment, the multicast session is in session when the UE receives the MRB configuration. The UE establishes the MRB in the RRC INACTIVE state based on the received MRB configuration. In one embodiment, the UE receives the multicast service in the RRC INACTIVE and updates the multicast resource/MTCH information based on one or more predefined conditions. In one embodiment, the UE updates the MTCH information in the INACTIVE state when the UE moves to another cell in the same RAN-based notification area (RNA). In another embodiment, the UE updates the MTCH information when detecting network updates. In yet another embodiment, the multicast resource information is updated periodically.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 10 illustrates an exemplary flow chart for the UE to receive multicast in the RRC INACTIVE state in accordance with embodiments of the current invention.

FIG. 11 illustrates an exemplary flow chart for the base station to configure and update MRB configuration for the UE receiving multicast services in the RRC INACTIVE state in accordance with embodiments of the current invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services, such as enhanced mobile broadband targeting wide bandwidth, millimeter wave targeting high carrier frequency, massive machine type communications targeting non backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co-exist in the same subframe.

Figure 1:
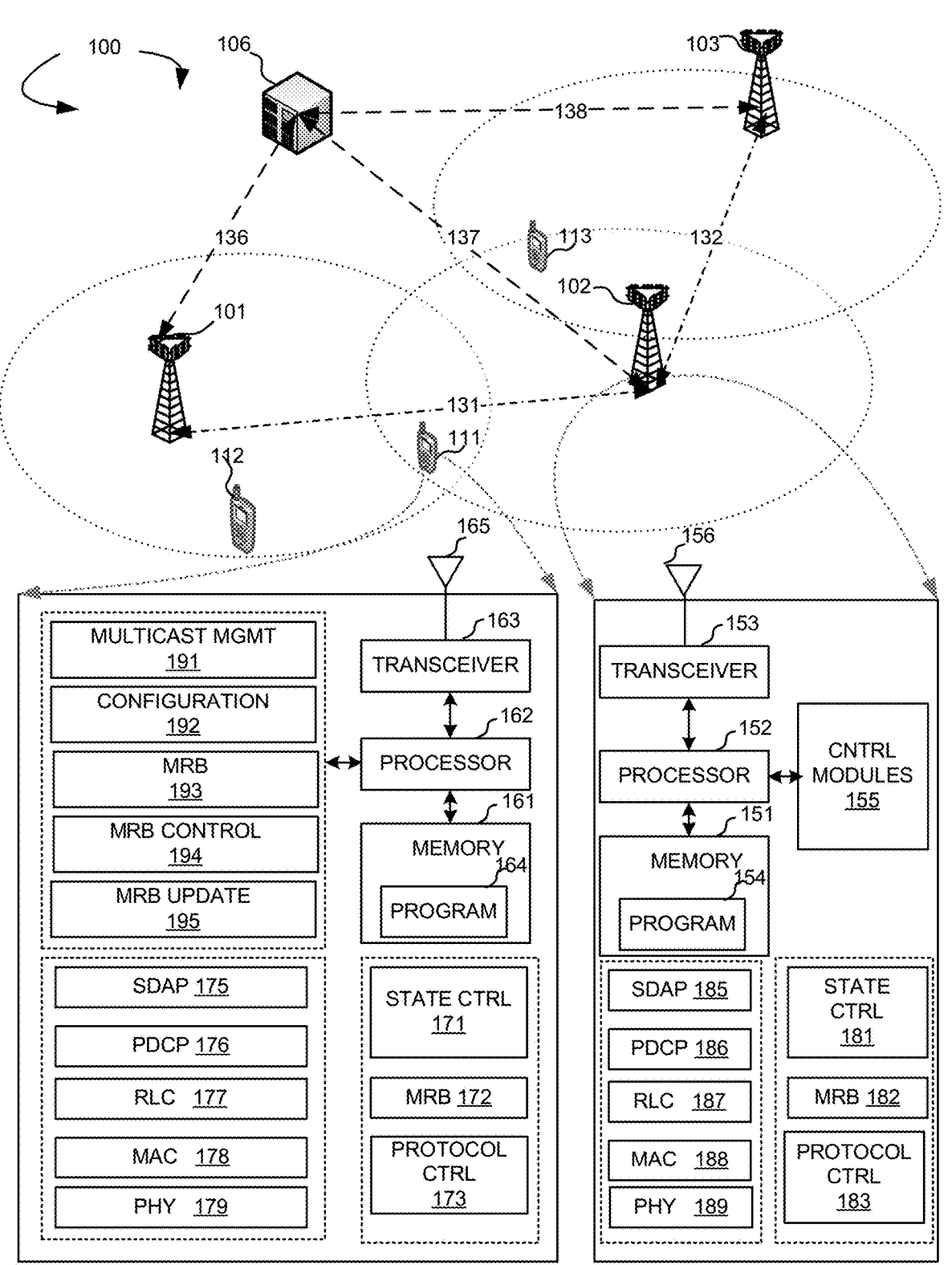
FIG. 1 is a schematic system diagram illustrating an exemplary wireless network for the UE to receive multicast services in the RRC INACTIVE state in accordance with embodiments of the current invention.

FIG. 1 is a schematic system diagram illustrating an exemplary wireless network for the UE to receive multicast services in the RRC INACTIVE state in accordance with embodiments of the current invention. Wireless system 100 includes one or more fixed base infrastructure units forming a network distributed over a geographical region. As an example, base stations/gNBs 101, 102, and 103 serve a number of mobile stations, such as UE 111, 112, and 113, within a serving area, for example, a cell, or within a cell sector. In some systems, one or more base stations are coupled to a controller forming an access network that is coupled to one or more core networks, through a network entity, such as network entity 106. gNB 101, gNB 102 and gNB 103 are base stations in the wireless network, the serving area of which may or may not overlap with each other. As an example, UE or mobile station 112 is only in the service area of gNB 101 and connected with gNB 101. UE 112 is connected with gNB 101 only. UE 111 is in the overlapping service area of gNB 101 and gNB 102 and may switch back and forth between gNB 101 and gNB 102. UE 113 is in the overlapping service area of gNB 102 and gNB 103 and may switch back and forth between gNB 102 and gNB 103. Base stations, such as gNB 101, 102, and 103 are connected the network through network entities, such as network entity 106 through backhaul connections, such as 136, 137, and 138, respectively. Xn connections 131 and 132 connect the non-co-located receiving base units. Xn connection 131 connects gNB 101 and gNB 102. Xn connection 132 connects gNB 102 and gNB 103. These Xn/NG connections can be either ideal or non-ideal. In one embodiment, both gNB 101 and gNB 102 provide the same Multicast and Broadcast Services (MBS), service continuity during handover is guaranteed when UE 111 moves from gNB 101 to gNB 102 and vice versa.

FIG. 1 further illustrates simplified block diagrams of a base station and a mobile device/UE for data/control transmissions. gNB 102 has an antenna 156, which transmits and receives radio signals. An RF transceiver circuit 153, coupled with the antenna 156, receives RF signals from antenna 156, converts them to baseband signals, and sends them to a processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 also includes a set of control modules 155 that carry out functional tasks to communicate with mobile stations. In one novel aspect, control module 155 is configured to receive a joining request for a multicast service from a UE in a wireless network, transmit a multicast radio bearer (MRB) configuration/PTM configuration to the UE for the multicast service preparing for a multicast reception in a UE RRC INACTIVE state for the UE, transmit the multicast to the UE in the RRC INACTIVE state, and update MTCH information for the multicast service based on one or more preconfigured conditions. An RRC state controller 181 performs access control for the UE. An MRB controller 182 performs control function to establish/add, reconfigure/modify, and release/remove an MRB based on different sets of conditions for MRB establishment, reconfiguration, and release. A protocol stack controller 183 manages to add, modify, or remove the protocol stack for the MRB. The protocol stack includes PHY layer 189, MAC layer 188, RLC layer 187, PDCP layer 186 and SDAP layer 185.

UE 111 has an antenna 165, which transmits and receives radio signals. An RF transceiver circuit 163, coupled with the antenna 165, receives RF signals from antenna 165, converts them to baseband signals, and sends them to processor 162. In one embodiment, the RF transceiver 163 may comprise two RF modules (not shown). A first RF module is used for HF transmitting and receiving, and the other RF module is used for different frequency bands transmitting and receiving, which is different from the HF transceiver. RF transceiver 163 also converts received baseband signals from processor 162, converts them to RF signals, and sends out to antenna 165. Processor 162 processes the received baseband signals and invokes different functional modules to perform features in the UE 111. Memory 161 stores program instructions and data 164 to control the operations of the UE 111. Antenna 165 sends uplink transmission and receives downlink transmissions to/from antenna 156 of gNB 102.

UE 111 also includes a set of control modules that carry out functional tasks. These control modules can be implemented by circuits, software, firmware, or a combination of them. An RRC State controller 171 controls UE's RRC state according to network's command and UE conditions. RRC supports the following states, RRC IDLE, RRC CONNECTED and RRC INACTIVE. An MRB controller 172 controls to establish/add, reconfigure/modify and release/remove a DRB based on different sets of conditions for MRB establishment, reconfiguration and release. A protocol stack controller 173 manages to add, modify or remove the protocol stack for the MRB. The protocol stack includes SDAP layer 175, PDCP layer 176, RLC layer 177, MAC layer 178 and PHY layer 179.

A multicast management module 191 joins a multicast session in the wireless network. A configuration module 192 receives a MRB configuration for the multicast service from the wireless network. An MRB module 193 establishes an MRB for reception of a multicast service in a radio resource control (RRC) INACTIVE state based on the MRB configuration. A multicast control module 194 receives data transmissions of the multicast service from the wireless network with the established MRB in the RRC INACTIVE state. A multicast update module 195 obtains and updates multicast traffic channel (MTCH) information for the multicast service in the RRC INACTIVE state upon detecting one or more preconfigured conditions, and wherein the one or more preconfigured conditions comprise UE moving to another cell in a same RAN-based notification area (RNA), UE updates its interest in the multicast session, a periodic MTCH update, and detects changes of the multicast services.

Figures 2A, 2B:
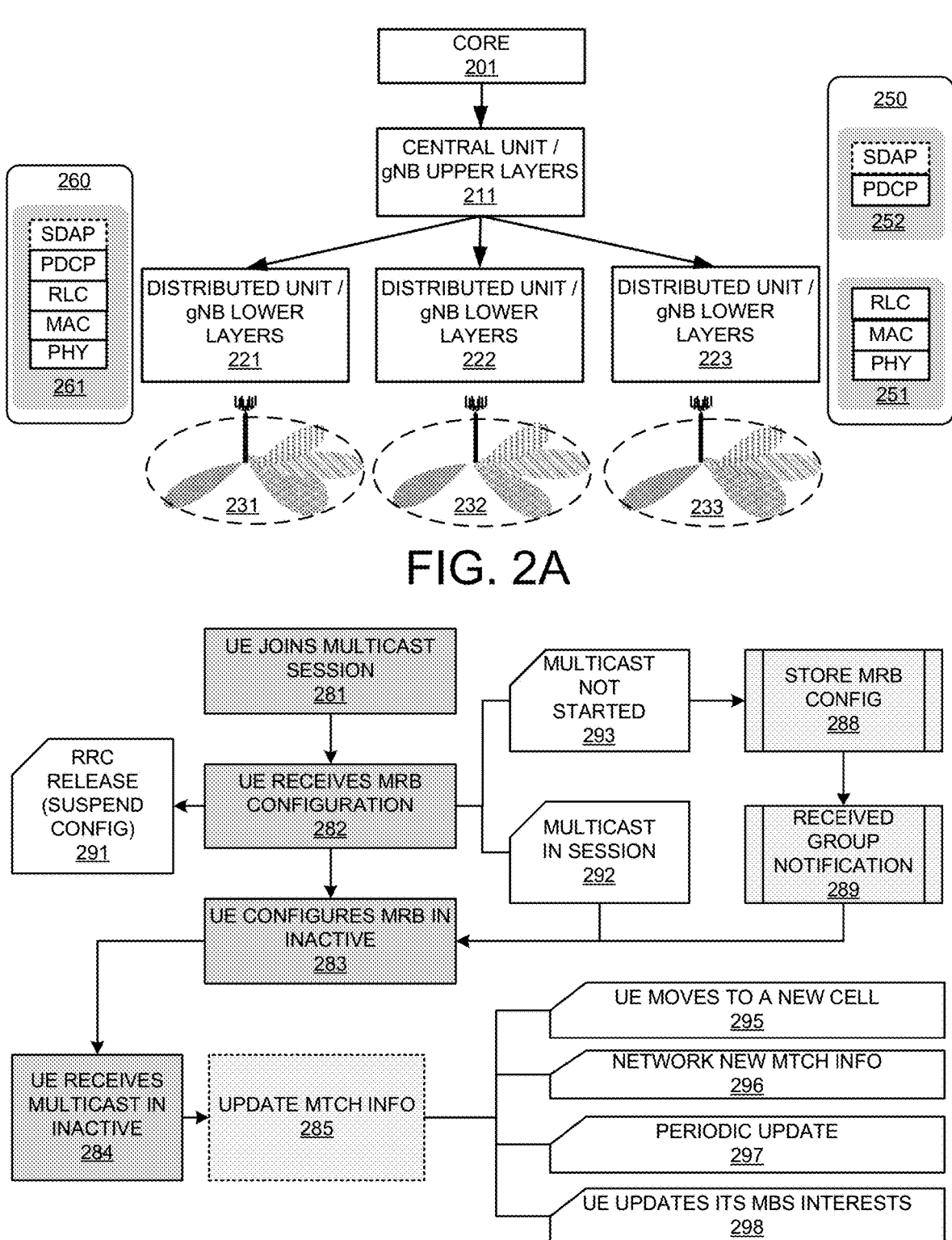
FIG. 2A illustrates an exemplary NR wireless system with centralized upper layers of the NR radio interface stacks and UE stack with multicast protocol and unicast protocol in accordance with embodiments of the current invention.
FIG. 2B illustrates an exemplary top level diagram for the UE to receive multicast in the RRC INACTIVE state in accordance with embodiments of the current invention.

FIG. 2A illustrates an exemplary NR wireless system with centralized upper layers of the NR radio interface stacks and UE stack with multicast protocol and unicast protocol in accordance with embodiments of the current invention. Different protocol split options between central unit (CU) and distributed unit (DU) of gNB may be possible. The functional split between the CU and DU of gNB may depend on the transport layer. Low performance transport between the CU and DU of gNB can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layers are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs 221, 222 and 223 include gNB lower layers 251, respectively. In one embodiment, gNB lower layers 251 include the PHY, MAC and the RLC layers. In another embodiment 260, each gNB/DU has the protocol stacks 261 including SDAP, PDCP, RLC, MAC and PHY layers.

FIG. 2B illustrates an exemplary top level diagram for the UE to receive multicast in the RRC INACTIVE state in accordance with embodiments of the current invention. In one novel aspect, the UE joins a multicast service and receives the multicast service in RRC INACTIVE state. At step 281, the UE joins a multicast session. At step 282, the UE receives multicast radio bearer (MRB) configuration. In one embodiment, the UE receives the MRB configuration in the RRC INACTIVE state. In another embodiment (291), the UE receives an RRC Release message with the multicast configuration indicated with the suspend configuration. The RRC release message puts the UE into the RRC INACTIVE state. In one embodiment (292), when the MRB configuration is received, the multicast service is in session. The UE, at step 283, configured the MRB in RRC INACTIVE state based on the MRB configuration. In another embodiment (293), the MRB configuration is received when the multicast session is not started/activated yet. The UE, at step 288, stores the MRB configuration and monitors for the multicast service. At step 289, the UE receives a notification in the RRC INACTIVE state for the start/activation of the multicast session. In one embodiment, the notification is a group paging notification. Upon receiving the notification, the UE in the INACTIVE state configures the MRB for multicast based on the stored MRB configuration. At step 284, the UE receives multicast data transmission in the RRC INACTIVE state. In one embodiment (285), the UE obtains and updates MTCH information for the multicast service in the RRC INACTIVE state upon detecting one or more predefined conditions. In one embodiment (295), UE updates the MTCH information for the multicast when the UE moves to another cell in a same RAN-based notification area (RNA). In another embodiment (296), the UE updates the MTCH information for the multicast when detecting changes of the MTCH information for multicast services. In yet another embodiment (297), the MTCH information/multicast configuration is updated periodically. In another embodiment (298), UE updates its interest in the multicast session.

Figures 3, 4, 5:
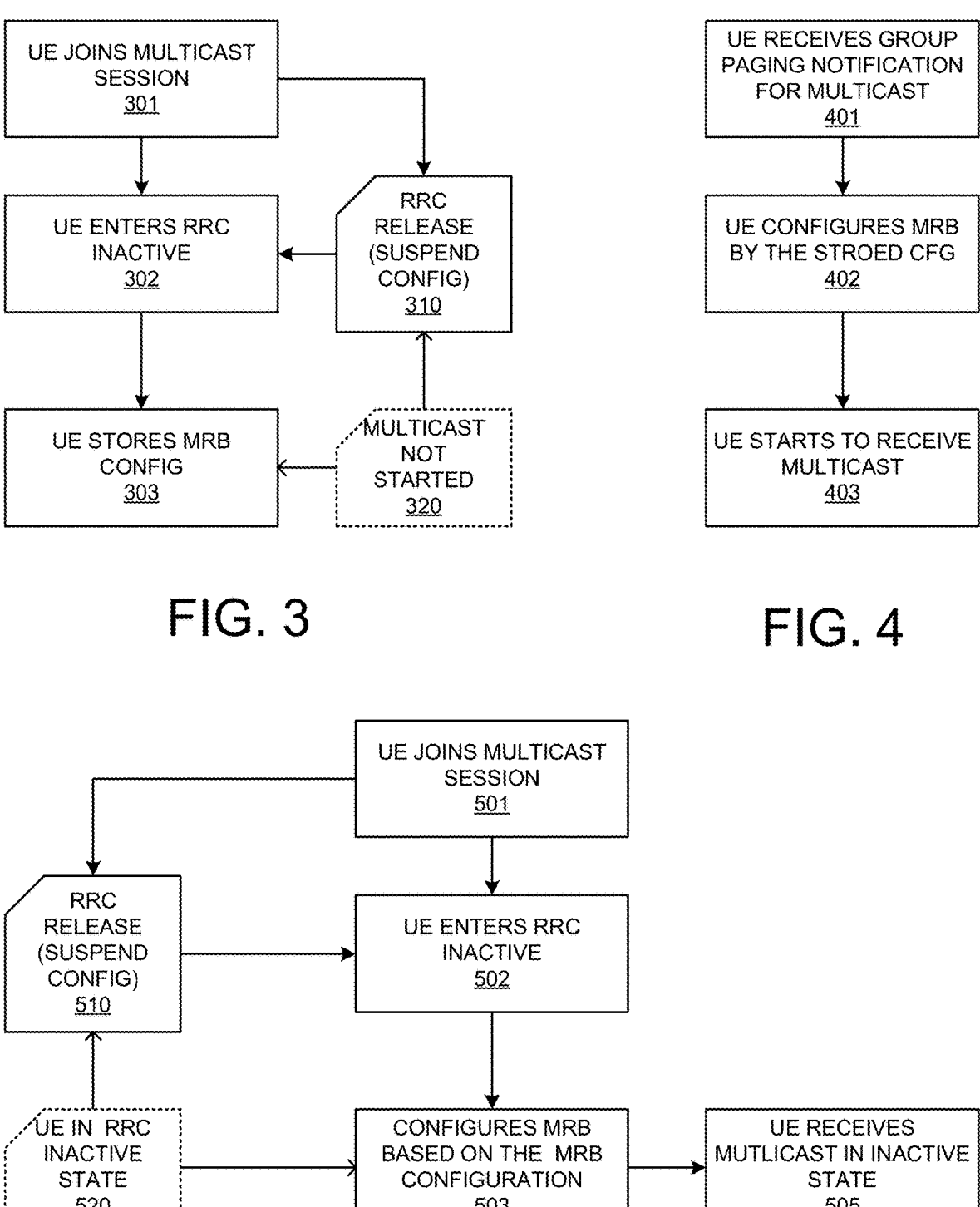
FIG. 3 illustrates an exemplary flow chart for the UE stores the MRB configuration when the multicast is not in session in accordance with embodiments of the current invention.
FIG. 4 illustrates an exemplary flow chart for the UE to apply the stored MRB configuration upon receiving notification of the multicast service in accordance with embodiment of the current invention.
FIG. 5 illustrates an exemplary flow chart for the UE to configure MRB and receive multicast service in the RRC INACTIVE state in accordance with embodiments of the current invention.

FIG. 3 illustrates an exemplary flow chart for the UE to store the MRB configuration when the multicast is not in session/not activated in accordance with embodiments of the current invention. At step 301, the UE joins a multicast session. In one scenario, when UE joins the multicast session, the session is not started yet, or the session has already started but temporarily has no DL data. In this scenario, the network sends the UE to INACTIVE state. In one embodiment, at step 310, the UE receives RRCRelease with suspendconfig. In one embodiment, the multicast MRB configuration is delivered in the suspendconfig. In one embodiment, the network sends UE to RRC idle by RRCRelease, and the MRB configuration is delivered in the RRCRelease message. In one embodiment, at step 320, the UE detects that the multicast session is not started when the UE receives the multicast configuration. At step 303, the UE stores the multicast configuration in buffer.

FIG. 4 illustrates an exemplary flow chart for the UE to apply the stored MRB configuration upon receiving notification of the multicast service in accordance with embodiments of the current invention. At step 401, the UE receives notification for the multicast session activation when the UE is in the RRC INACTIVE state. In one embodiment, the notification is a group paging notification. At step 402, in one embodiment, the UE performs a multicast MRB configuration procedure according to the stored multicast configuration in the RRC INACTIVE state. In another embodiment, UE is in RRC IDLE state, and UE requests to switch back to RRC CONNECTED, then performs a multicast MRB configuration procedure according to the stored multicast configuration. After UE performs the multicast MRB configuration, at step 403, UE starts to receive the multicast service. In one embodiment, UE stays in RRC INACTIVE state to receive multicast service.

FIG. 5 illustrates an exemplary flow chart for the UE to configure MRB and receive multicast service in the RRC INACTIVE state in accordance with embodiments of the current invention. At step 501, the UE joins the multicast session when the session has already started. In one scenario, the network wants the UE to receive data in RRC INACTIVE state and sends UE to RRC INACTIVE state by RRCRelease with suspendconfig. At step 510, the UE receives RRCRelease with suspendconfig. At step 502, the UE enters RRC INACTIVE state. In one embodiment, the multicast MRB configuration is delivered in the suspendconfig. At step 503, UE, in INACTIVE state 520, performs a multicast MRB configuration procedure according to the indication (510) received from the network. After UE performs the multicast MRB configuration, at step 505, UE starts to receive the multicast service in RRC INACTIVE state.

Figure 6:
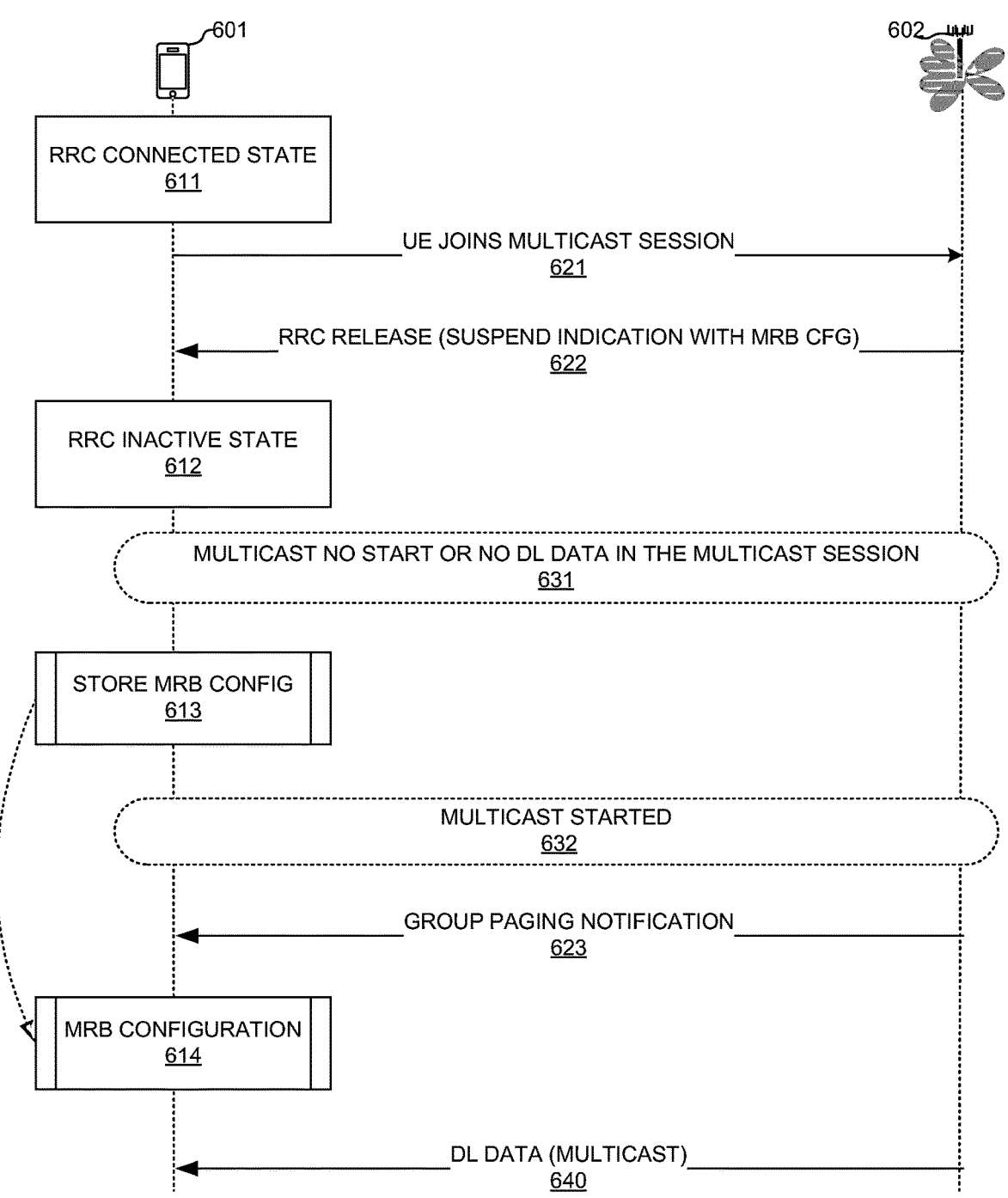
FIG. 6 illustrates an example message diagram for UE to set MRB configuration for multicast reception by RRCRelease message and perform a multicast MRB configuration procedure in accordance with embodiments of the current invention.

FIG. 6 illustrates an example message diagram for UE to set MRB configuration for multicast reception by RRCRelease message and perform a multicast MRB configuration procedure in accordance with embodiments of the current invention. UE 601 is connected with gNB 602. UE 601 is in the RRC CONNECTED state (611). At step 621, the UE joins the multicast session. In one scenario, the UE joined a multicast session in RRC CONNECTED state and there is temporarily no DL data in the multicast session or the multicast session has not started yet. At step 622, the network sends UE to RRC INACTIVE state by RRCRelease with suspend indication. In one embodiment, the UE enters RRC INACTIVE state. After entering the RRC INACTIVE state, the multicast session has not yet started or there is temporarily no DL data in the multicast session (631). In one embodiment, the multicast MRB configuration is delivered in the suspend indication, which indicates the MTCH information for the upcoming multicast session. At step 613, the UE stores the MRB configuration in RRC INACTIVE state. At step 632, the multicast session starts, or the DL multicast data starts. At step 623, the UE receives a group paging notification from the network. In one embodiment, UE establishes an RRC connection and receives multicast service in RRC CONNECTED. In one embodiment (614), UE performs a multicast MRB configuration procedure. In one embodiment, the MRB configuration procedure is based on the stored multicast configuration. At step 640, the UE receives the multicast service in RRC INACTIVE.

Figure 7:
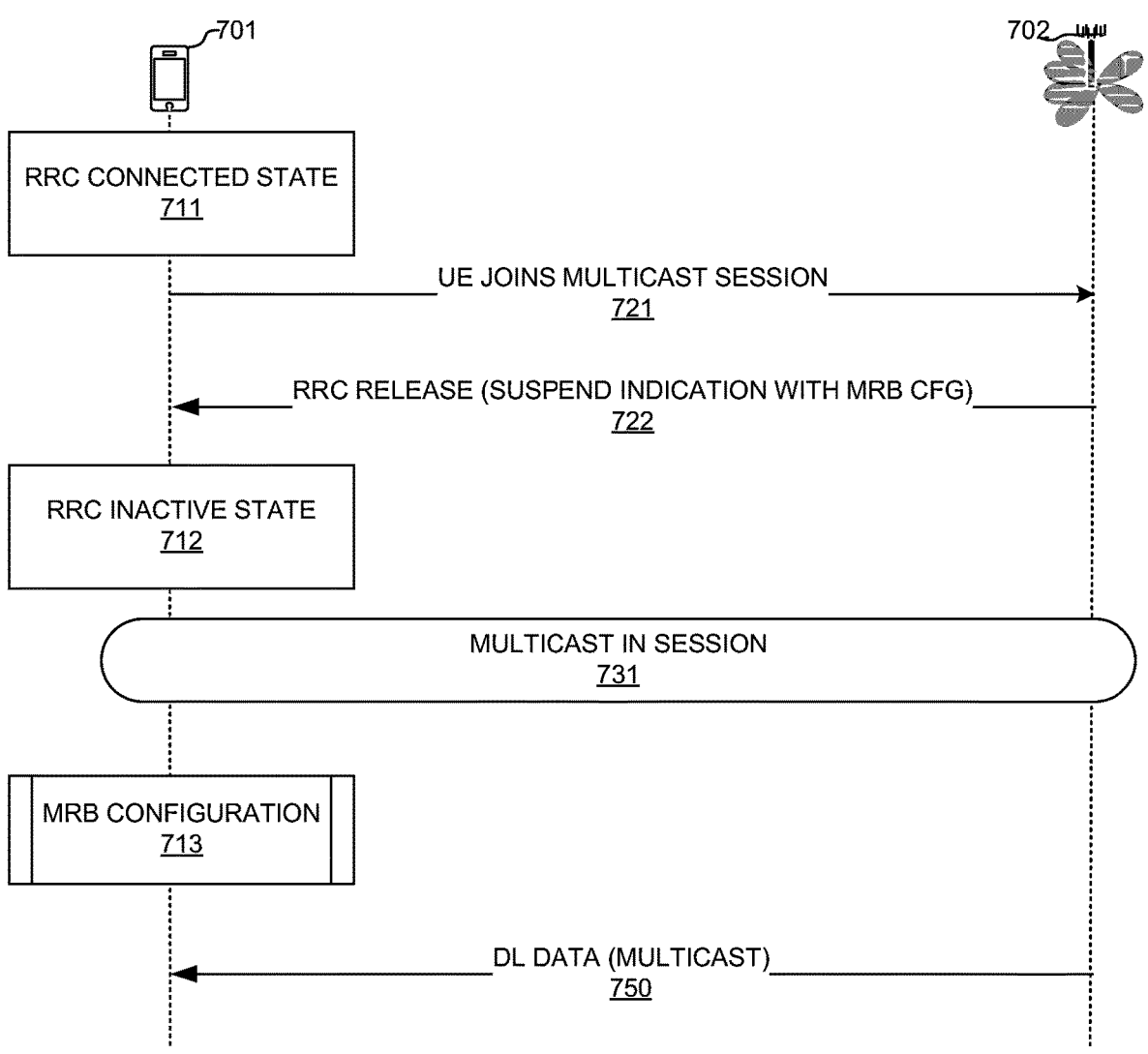
FIG. 7 illustrates an exemplary message diagram for the UE to receive multicast in RRC INACTIVE state with multicast in session in accordance with embodiments of the current invention.

FIG. 7 illustrates an exemplary message diagram for the UE to receive multicast in RRC INACTIVE state with multicast in session/session activating in accordance with embodiments of the current invention. UE 701 is connected with gNB 702. UE 701 is in the RRC CONNECTED state (711). At step 721, the UE joins the multicast session. In one scenario, the UE joined a multicast session in RRC CONNECTED state and the multicast session is ongoing. In one embodiment, the network sends UE to RRC INACTIVE state. At step 722, the UE receives RRCRelease with suspend indication. At step 712, the UE enters the RRC INACTIVE state. In one embodiment, the multicast MRB configuration is delivered in the suspend indication, which indicates the MTCH information for the upcoming multicast session. In another embodiment, the multicast MRB configuration is delivered by RRCReconfiguration message before RRCRelease message. Upon receiving the MRB configuration and the multicast is in session (731), the UE performs a multicast MRB configuration procedure at step 713. At step 750, the UE receives the multicast service in RRC INACTIVE state.

Figure 8:
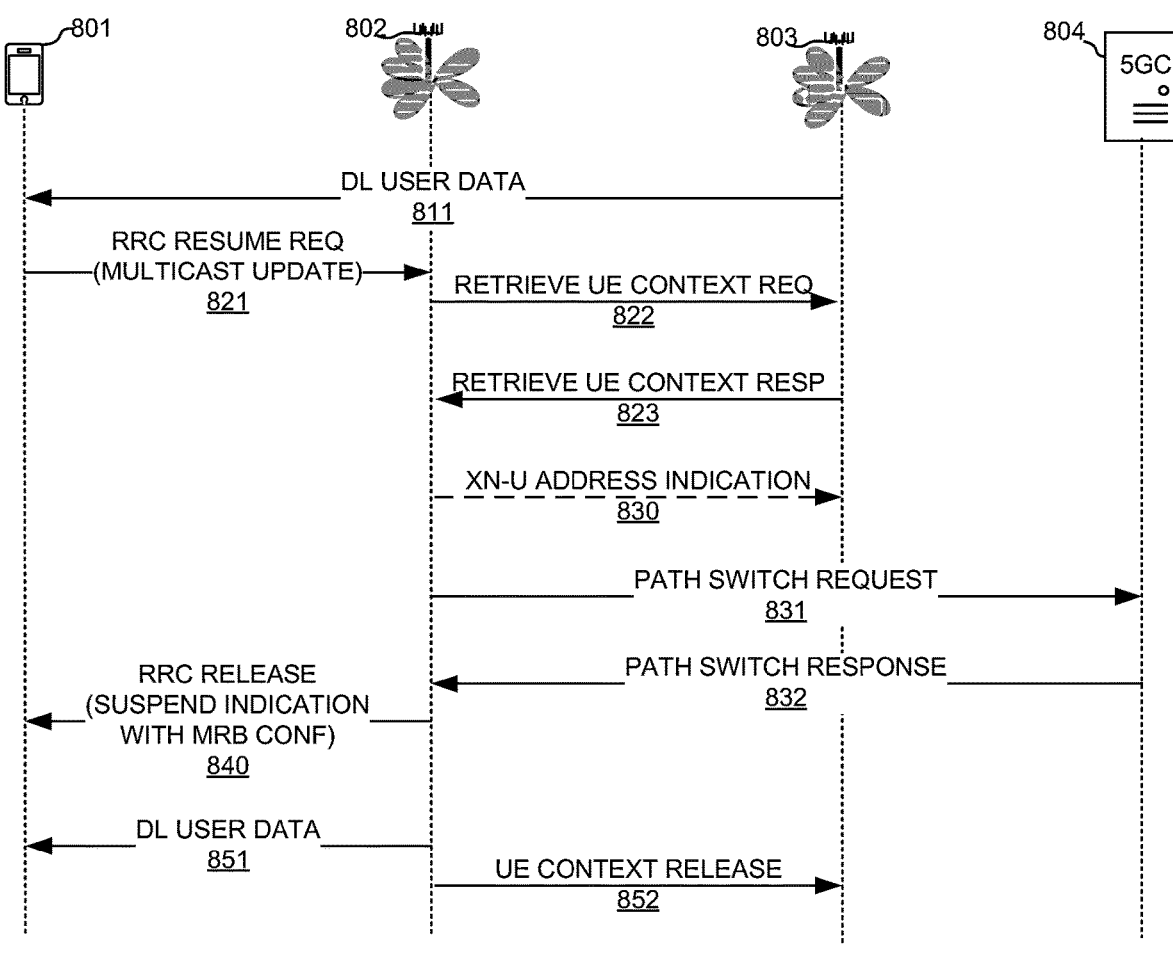
FIG. 8 illustrates an exemplary message diagram for UE to trigger a multicast update procedure and receive multicast service from target gNB in RRC INACTIVE state in accordance with embodiments of the current invention.

FIG. 8 illustrates an exemplary message diagram for UE to trigger a multicast update procedure and receive multicast service from target gNB in RRC INACTIVE state in accordance with embodiments of the current invention. UE 801 is connected with source gNB 803 in a wireless network. gNB 803 is connected with the network access and mobility management function (AMF) 804. In one embodiment, the UE performs MRB configuration/PTM configuration/ MTCH updates upon detecting one or more predefined conditions. In one embodiment, the UE updates the MRB configuration when the UE performs handover to another cell with the same RNA. As illustrated, the UE performs handover from source gNB 803 to target gNB 802, which is also connected with AMF 804. At step 811, the UE receives DL multicast data from source gNB 803 in RRC INACTIVE state. At step 821, the UE sends RRCResumeRequest to the target gNB 802, providing the inactive RNTI (I-RNTI), allocated by the last serving gNB and an appropriate cause value. In one embodiment, the cause value is specific to update multicast reception in RRC INACTIVE. In one embodiment, UE sends RRCResumeRequest with multicast update for ResumeCause when UE moves to a different cell. In one embodiment, UE sends RRCResumeRequest with multicast update for ResumeCause when UE is in the same cell, but the MTCH information for multicast service which UE interested in has been changed. In one embodiment, UE sends RRCResumeRequest with multicast update for ResumeCause periodically. At step 822, target gNB 802, if able to resolve the gNB identity contained in the I-RNTI, requests the last serving gNB 803 to provide UE Context, and provides the cause value received at step 821 to the last serving gNB 803. At step 823, source gNB 803 sends retrieve UE context response to target gNB 802. At step 830, if loss of DL user data buffered in the last serving gNB 803 shall be prevented, the target gNB 802 provides forwarding addresses to source gNB 803. At step 831, target gNB 802 sends PATH SWITCH REQUEST to AMF 804. At step 832, AMF 804 indicates PATH SWITCH RESPONSE to target gNB 802. At step 840, target gNB 802 keeps the UE in RRC_INACTIVE state by sending RRCRelease with suspend indication. In one embodiment, the multicast MRB configuration is delivered in the suspend indication, which indicates the MTCH information for the multicast session which UE is interested in. UE performs multicast MRB configuration procedure according to the indication. At step 851, the UE receives multicast service from target gNB 802 in RRC INACTIVE state. At step 852, target gNB 802 triggers the release of the UE resources at the last serving gNB/source gNB 803.

Figure 9:
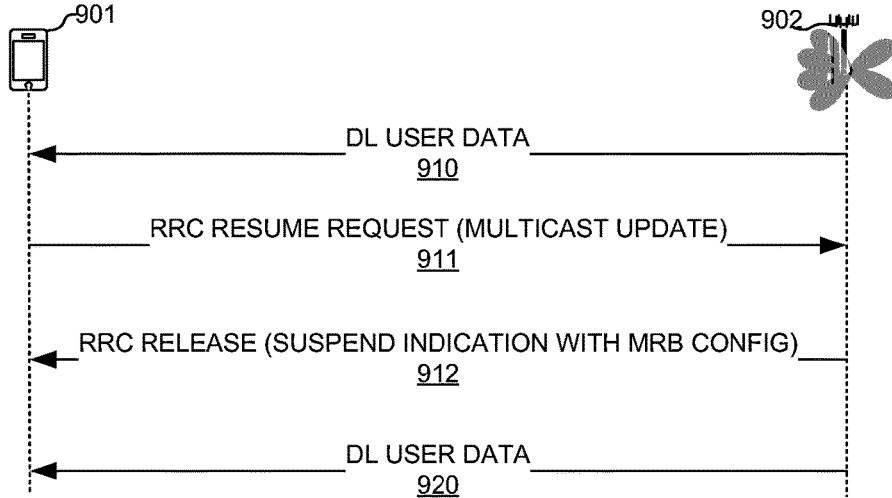
FIG. 9 illustrates an exemplary message diagram for the case when UE triggers a multicast update procedure and the gNB decides not to relocate the UE context in accordance with embodiments of the current invention.

FIG. 9 illustrates an exemplary message diagram for the case when UE triggers multicast update procedure and the gNB decides not to relocate the UE context in accordance with embodiments of the current invention. UE 901 is connected with gNB 902. At step 910, before UE 901 triggers the multicast update procedure, UE receives the DL user data in RRC INACTIVE state from the gNB 902. At step 911, UE 901 sends RRCResumeRequest to the gNB 902, providing the I-RNTI, allocated by the last serving gNB and an appropriate cause value. In one embodiment, the cause value is specific to update multicast reception in RRC INACTIVE. In one embodiment, UE sends RRCResumeRequest with multicast update for ResumeCause when UE moves to a different cell. In one embodiment, UE sends RRCResumeRequest with multicast update for Resume-Cause when UE is in the same cell, but the MTCH information for multicast service which UE interested in has been changed. In one embodiment, UE sends RRCResumeRequest with multicast update for ResumeCause periodically. At step 912, gNB 902 keeps the UE 901 in RRC_INAC-TIVE state by sending RRCRelease with suspend indication. In one embodiment, the multicast MRB configuration is delivered in the suspend indication, which indicates the MTCH information for the multicast session which UE is interested in. UE performs multicast MRB configuration procedure according to the indication. At step 920, the UE receives multicast service in RRC INACTIVE state.

FIG. 10 illustrates an exemplary flow chart for the UE to receive multicast in RRC INACTIVE state in accordance with embodiments of the current invention. At step 1001, the UE joins a multicast session in a wireless network. At step 1002, the UE receives a multicast radio bearer (MRB) configuration for the multicast service from the wireless network. At step 1003, the UE establishes a MRB for reception of a multicast service in a radio resource control (RRC) INACTIVE state based on the MRB configuration. At step 1004, the UE receives data transmissions of the multicast service from the wireless network with the established MRB in the RRC INACTIVE state.

FIG. 11 illustrates an exemplary flow chart for a network entity to configure and update MRB configuration for the UE receive multicast services in the RRC INACTIVE state in accordance with embodiments of the current invention. At step 1101, the network entity receives a joining request for a multicast session from a user equipment (UE) in a wireless network. At step 1102, the network entity transmits a multicast radio bearer (MRB) configuration to the UE for a multicast service preparing for a multicast reception in a radio resource control (RRC) INACTIVE state for the UE. At step 1103, the network entity transmits the multicast data to the UE in the RRC INACTIVE state. At step 1104, the network entity updates multicast traffic channel (MTCH) information for the multicast service based on one or more preconfigured conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

joining, by a user equipment (UE), a multicast session in a wireless network;

receiving a multicast radio bearer (MRB) configuration for a multicast service from the wireless network;

establishing a MRB for reception of the multicast service in a radio resource control (RRC) INACTIVE state based on the MRB configuration;

receiving data transmissions of the multicast service from the wireless network with the established MRB in the RRC INACTIVE state, and obtaining and updating multicast traffic channel (MTCH) information for the multicast service in the RRC INACTIVE state upon detecting one or more preconfigured conditions.

2. The method of claim 1, wherein the MRB configuration is received in a radio resource control (RRC) release message.

3. The method of claim 2, wherein the MRB configuration is delivered by suspendconfig in the RRC release message.

4. The method of claim 1, further comprising storing the MRB configuration by the UE if the multicast session is not started when the MRB configuration is received.

5. The method of claim 4, further comprising:

receiving a notification from the wireless network that the multicast session is started, and wherein the establishing of the MRB involves applying the stored MRB configuration upon receiving the notification.

6. The method of claim 5, wherein the notification is a group notification carried in a group paging.

7. The method of claim 1, wherein the one or more preconfigured conditions comprises UE moving to another cell in a same RAN-based notification area (RNA), UE updates its interest in the multicast session, a periodic MTCH update and detecting changes of the MTCH information for multicast services.

8. The method of claim 7, wherein the UE obtains MTCH information by sending a RRCResumeRequest to the wireless network.

9. The method of claim 8, wherein the RRCResumeRequest includes one or more elements comprising an inactive RNTI (I-RNTI) allocated by a serving cell, and an appropriate cause value.

10. A method comprising:

receiving, by a network entity, a joining request for a multicast session from a user equipment (UE) in a wireless network;

transmitting, by a network entity of a wireless network, a multicast radio bearer (MRB) configuration to the UE for a multicast service preparing for a multicast reception in a radio resource control (RRC) INACTIVE state for the UE;

transmitting multicast data for the multicast service to the UE in the RRC INACTIVE state; and updating multicast traffic channel (MTCH) information for the multicast service based on one or more preconfigured conditions, wherein the updated MTCH information is transmitted to at least one UE in the RRC INACTIVE state.

11. The method of claim 10, wherein the MRB configuration is transmitted in a radio resource control (RRC) release message.

12. The method of claim 11, wherein the MRB configuration is delivered by suspendconfig in the RRC release message.

13. The method of claim 10, wherein the network entity updates the MTCH information periodically.

14. The method of claim 10, further comprising switching path for the UE to a target cell to receive the multicast data in the RRC INACTIVE state.

15. A user equipment (UE), comprising:

a transceiver that transmits and receives radio frequency (RF) signal in a wireless network;

a multicast management module that joins a multicast session in the wireless network;

a configuration module that receives a multicast radio bearer (MRB) configuration for a multicast service from the wireless network;

an MRB module that establishes a MRB for reception of the multicast service in a radio resource control (RRC) INACTIVE state based on the MRB configuration; and a multicast control module that receives data transmissions of the multicast service from the wireless network with the established MRB in the RRC INACTIVE state, and obtains and updates multicast traffic channel (MTCH) information for the multicast service in the RRC INACTIVE state upon detecting one or more preconfigured conditions.

16. The UE of claim 15, wherein the MRB configuration is received in a radio resource control (RRC) release message.

17. The UE of claim 16, wherein the MRB configuration is delivered by suspendconfig in the RRC release message.

18. The UE of claim 15, wherein the configuration module further stores the MRB configuration if the multicast session is not started when the MRB configuration is received.

19. The UE of claim 18, wherein the multicast control module further receives a notification from the wireless network that the multicast session is started and applies the stored MRB configuration upon receiving the notification.

20. The UE of claim 15, further comprises a multicast update module that obtains and updates multicast traffic channel (MTCH) information for the multicast service in the RRC INACTIVE state upon detecting one or more preconfigured conditions, and wherein the one or more preconfigured conditions comprise UE moving to another cell in a same RAN-based notification area (RNA), UE updates its interest in the multicast session, a periodic MTCH update, and detects changes of the multicast services.

* * * * *